US 6,527,416 B1

(12) United States Patent
Reason et al.

(10) Patent No.: US 6,527,416 B1
(45) Date of Patent: Mar. 4, 2003

(54) LASER INDICATOR HAVING ROUNDED LENS TO WIDEN A LASER BEAM

(76) Inventors: Richard E. Reason, 135 Ridge Dr., Woodland Park, CO (US) 80863; Christina L. Reason, 135 Ridge Dr., Woodland Park, CO (US) 80863

( * ) Notice: Subject to any disclaimer, the term of this patent is extended or adjusted under 35 U.S.C. 154(b) by 0 days.

(21) Appl. No.: 09/663,622

(22) Filed: Sep. 18, 2000

(51) Int. Cl.[7] ................................................. F21K 2/00
(52) U.S. Cl. ...................... 362/259; 362/205; 362/109; 362/277
(58) Field of Search .................... 362/486, 259, 362/335, 331, 174, 205, 106, 277, 319, 282, 253

(56) References Cited

U.S. PATENT DOCUMENTS

| | | | | |
|---|---|---|---|---|
| 4,853,543 A | * | 8/1989 | Ozdemir | 250/372 |
| 5,584,568 A | * | 12/1996 | Corbasson et al. | 362/268 |
| 6,068,484 A | * | 5/2000 | O'Loughlin et al. | 434/22 |
| 6,142,650 A | * | 11/2000 | Brown et al. | 362/259 |

* cited by examiner

Primary Examiner—Thomas M. Sember
Assistant Examiner—Ali Alavi
(74) Attorney, Agent, or Firm—G. F. Gallinger

(57) ABSTRACT

A beam from a laser is light which is much more efficiently produced and which much more efficiently projects over distance than light from an incandescent source. However, because of its concentrated nature laser light has generally been of no use in viewing objects. A laser indicator which uniformly disperses a laser beam so that it may be used to view objects and particulates in the air comprises: a laser generator for generating a parallel beam; a first lens positioned in front of the laser generator having a rounded curvature, so that as the beam of light projects through the lens, the parallel beam of light is uniformly diverged; and, a housing maintaining the laser generator and the first lens in alignment. For some applications the above laser indicator further provides for a power switch and a power source being a battery. The housing carries the power switch and further comprises a cavity to house the battery. The indicator may comprise a second lens, positioned in front of the laser generator and adjustably spaced from the first lens, so that the divergence of the parallel beam may be varied to accommodate varying distances and varying areas, desired to be illuminated for viewing.

3 Claims, 2 Drawing Sheets

LASER INDICATOR HAVING ROUNDED LENS TO WIDEN A LASER BEAM

FIELD OF THE INVENTION

This invention relates to the application of laser light to the illumination of objects. More particularly this invention relates to the production of a uniformly diverging beam of laser generated light useful for illuminating particulates in the air and objects in its path.

BACKGROUND OF THE INVENTION

The light generated by a laser is parallel to itself. Even over great distances the light does not diverge and loose its intensity. Unlike all other light sources which are subject to the inverse square law, intensity of laser light does not diminish over distance. However, for most applications of illumination laser generated light is assumed to have no utility. Objects cannot be viewed when only a small bright spot is illuminated on them.

In terms of power consumption the production of laser light is much more efficient than the production of incandescent light. The parallel alignment of the light waves in laser light can more efficiently be projected over distance. There are many applications where it would be highly desirable to more efficiently project light at a distance. For example, when an individual carries a flashlight which is powered by a battery, the battery all too frequently needs to be replaced. Wherever diode generated light has been able to replace incandescent light substantial power savings have been achieved. What is needed is an apparatus and method of uniformly diverging laser generated light.

Steam and other high pressure gas leaks are currently located by walking the pipeline waving a stick ahead of oneself. The problem with this method is that if one inadvertently misses the leak with the stick they may suffer sever burns. A better and safer method of locating a leak in a pipeline is needed.

Currently fire fighters have difficulty finding their way through smoke with conventional lighting. The lights used just seem to light up the smoke. They do not illuminate objects in the smoke. Similarly conventional lights on vehicles fail to look through particulates in the air in adverse weather conditions. Nor do they illuminate the florescent markings on the road. A light which can be better seen in a particulate laden environment and a light which can cut through the airborne particulates is needed.

OBJECTS OF THE INVENTION

It is an object of this invention to disclose an apparatus for uniformly diverging laser generated light so that the light can be used to illuminate objects. It is an object of this invention to disclose a substantially more efficient means of producing a beam of light. It is an object of this invention to disclose a means of producing a beam of light for the illumination of objects which can more efficiently be projected over distance than can be achieved by the common method of focusing a diametric portion of radially expanding light generated by a point source. It is yet a further object of this invention to disclose a safer method than currently available of locating a gas leak. It is yet a further object of this invention to disclose a lamp for firemen which can better illuminate objects through smoke, and; can be used as a position marker to identify their position in the event they need help. It is yet a further object of this invention to disclose a vehicle front lamp which can project further and better illuminate the road within the limitation of government mandated power consumption. It is yet a further object of this invention to disclose a vehicle tail lamp which will better identify the position of the vehicle to following vehicles particularly in adverse weather conditions and during emergency braking. And finally it is an object of this invention to disclose an improved method of locating a gas leak in a pipeline.

One aspect of this invention provides for a laser indicator, used with a power source, for illuminating objects and airborne particulates comprising: a laser generator for generating a parallel beam; a first lens positioned in front of the laser generator having a rounded curvature, so that as the beam of light projects through the lens, the parallel beam of light is uniformly diverged; and, a housing maintaining the laser generator and the first lens in alignment. The parallel beam of light uniformly diverges as it projects away from the first lens so that it can be used to illuminate objects and airborne particulates falling within it broadening path.

For some applications a preferred aspect of the above laser indicator further provides for a power switch and a power source being a battery. The housing carries the power switch and further comprises a cavity to house the battery. The indicator may comprise a second lens, positioned in front of the laser generator and adjustably spaced from the first lens, so that the divergence of the parallel beam may be varied to accommodate varying distances and varying areas, desired to be illuminated for viewing.

Various other objects, advantages and features of this invention will become apparent to those skilled in the art from the following description in conjunction with the accompanying drawings.

FIGURES OF THE INVENTION

Figure 1:
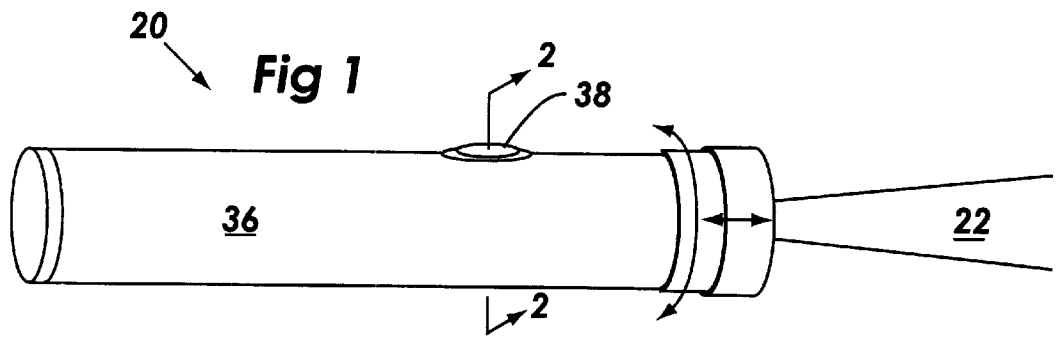
FIG. 1 is a perspective view of a battery powered laser indicator used to project a uniformly diverging beam of laser generated light.

The following is a discussion and description of the preferred specific embodiments of this invention, such being made with reference to the drawings, wherein the same reference numerals are used to indicate the same or similar parts and/or structure. It should be noted that such discussion and description is not meant to unduly limit the scope of the invention.

DESCRIPTION OF THE INVENTION

Figure 2:
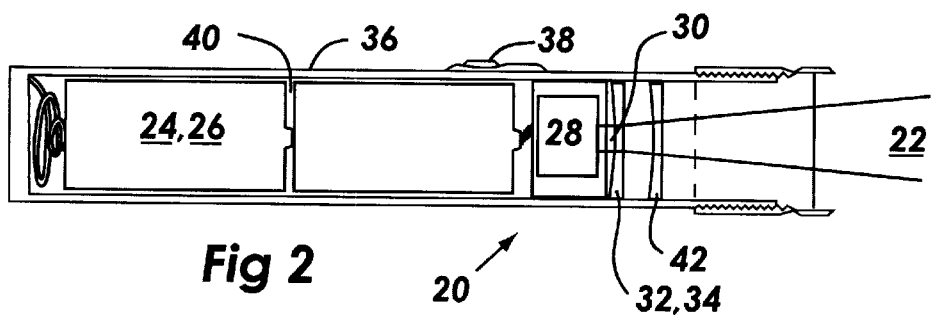
FIG. 2 is a cross sectional view of the laser indicator shown in FIG. 1 taken along line 2—2 therein.

Turning now to the drawings and more particularly to FIG. 1 we have a perspective view of a battery powered laser indicator 20 used to project a uniformly diverging beam 22 of laser generated light. FIG. 2 is a cross sectional view of the laser indicator 20 shown in FIG. 1 taken along line 2—2 therein. The laser indicator 20 is used for illuminating objects and airborne particulates (neither shown) when used with a power source 24. A laser generator 28 generates a parallel beam 30. A lens 32 is positioned in front of the laser generator 28 so that the beam of light 30 projects through the lens 32, said lens 32 has a rounded curvature for uniformly diverging the parallel beam of light 30. A housing 36 maintains the laser generator 28 and the lens 32 in alignment. The parallel beam of light 30 uniformly diverges as it projects from the lens 32 so that it can be used to illuminate objects and airborne particulates (neither shown) falling within it broadening path. Most preferably the lens 32 which has a rounded curvature to uniformly diverge the parallel beam of light 30 comprises a concave lens 34.

In some applications, particularly where the laser indicator 20 is carried by a person, the laser generator further comprises a power switch 38 and the power source 24 is a battery 26. The power switch 38 and is carried by the housing 36 which additionally comprises a cavity 40 to house the battery 26. In some applications, the indicator 20 comprises a second lens 42 which is positioned in front of the laser generator 28 and adjustably spaced from the first lens 32, so that the divergence of the parallel beam 30 may be varied to accommodate varying distances and varying areas, desired to be illuminated for viewing. It is contemplated that the spacing between the lenses 32,42 could be most conveniently varied by rotating an end portion of the indicator 20 similar to the manner in which the spacing on a zoom lens in a camera (not shown) is varied.

Figure 3:
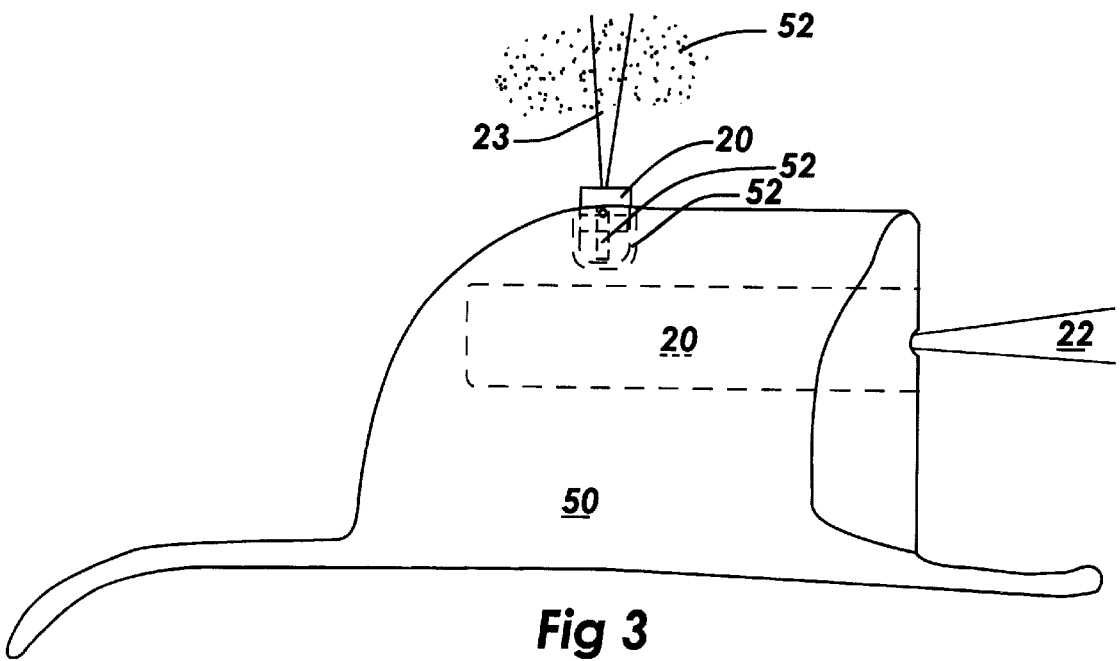
FIG. 3 is an elevational view of an illuminating/ marker helmet projecting a laser beam for the illumination of frontal objects and having an upwardly projected beam for the illumination of particulates in the air above the helmet.

FIG. 3 is an elevational view of an illuminating/ marker helmet 50 projecting a laser beam 22 for the illumination of frontal objects (not shown) and having an upwardly projected beam 23 for the illumination of particulates 52 in the air above the helmet 50. In a smoky environment an upward beam 23 can be used to mark the location of a fireman. If the upward beam 23 is projected from a laser indicator 20 which is pivotably carried in a yolk 52 which is itself pivotably carried within another yolk 52 then the beam 23 is directed upwardly regardless of the orientation of the helmet 50. The upwardly directed laser beam 23 could project from a laser indicator carried by a helmet 50 or an oxygen tank (not shown).

An indicator 20 that was invariably upwardly directed would assures that the location of a fireman would be visibly marked even if the fireman were to fall. For safety reasons firemen monitor the location of their team mates. Laser beams 22 better cut through smoke and reflect back than incandescent light. On Dec. the 4'th of 1999, six firemen died in a single fire in Boston. First two of these firemen entered a building, became disoriented in the smoke; they could be heard on radios but not visually located by four other firemen who entered the building to rescue them.

Figure 4:
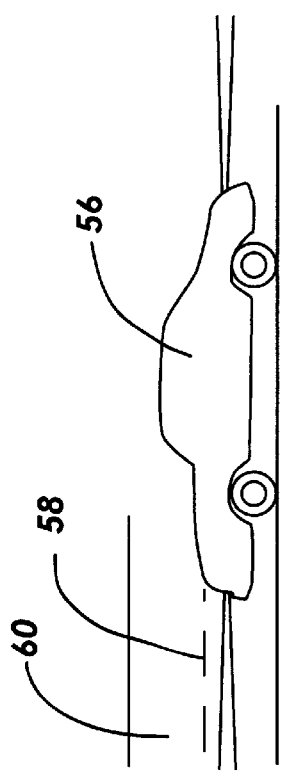
FIG. 4 is an elevational view of a vehicle having a laser indicator on its front and rear portion.

FIG. 4 is an elevational view of a vehicle 56 having a laser indicator 20 on its front and rear portion. The laser indicator 20 is positioned within a front portion of the vehicle 56 to illuminate the markings 58 on a roadway 60 in front of the vehicle. It is contemplated that a green laser generator 28 would be used on the front portion of vehicle. A laser indicator could also be advantageously positioned within a rear portion of the vehicle 56 to illuminate the rear portion of the vehicle 56 to others on the roadway 60. It is contemplated that a red laser generator 28 would be used on a rear portion of the vehicle 56. Green lasers, more than any other color of lasers are better able to cut through fog or snow.

Figure 5:
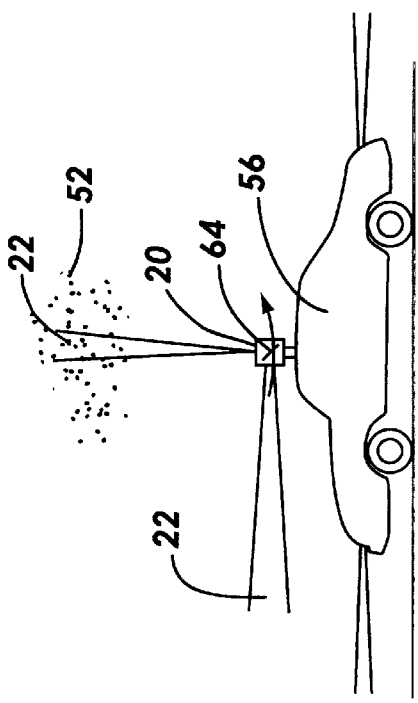
FIG. 5 is an elevational view of an emergency vehicle having an emergency laser indicator.

FIG. 5 is an elevational view of an emergency vehicle 56 having an emergency laser indicator 20. It is contemplated that the laser beam 22 would revolve indicating the presence of the emergency vehicle 56 to others on the roadway 60. This could be accomplished by having an upwardly directed beam 22 and an obliquely positioned revolving mirror 64. The beam 22 from the indicator 20 could also be directed upwardly to illuminate particulates 52 in the air in adverse weather conditions. In this way the presence of the emergency vehicle 56 could be detected on an opposite side of a hill.

Figure 6:
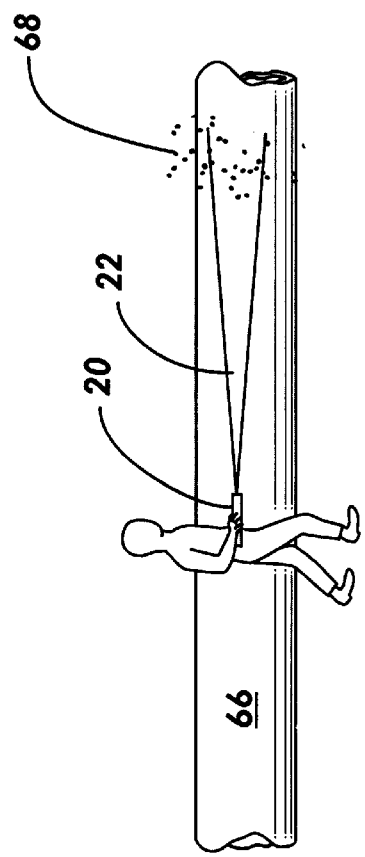
FIG. 6 is a diagrammatic view of a workman walking a pipeline with a laser indicator to detect the presence of gas leaking from the pipeline.

FIG. 6 is a diagrammatic view of a workman walking a pipeline with a laser indicator 20 to detect the presence of gas 68 leaking from the pipeline 66. Gas 68 invisible to the eye can be seen in a laser beam 22. The current method of walking the pipeline 66 waving a stick (not shown) in front of oneself is not only inefficient and tiresome, but dangerous. Lasers are less likely to trigger an explosion in an explosive gas than a flashlight.

Figure 7:
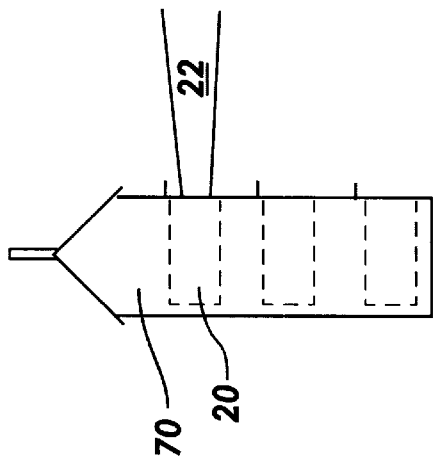
FIG. 7 is an elevational view of a traffic light fitted with laser indicators.

FIG. 7 is an elevational view of a traffic light 70 fitted with laser indicators 20. Laser beams 22 better project through fog and other adverse weather than incandescent light.

While the invention has been described with preferred specific embodiments thereof, it will be understood that this description is intended to illustrate and not to limit the scope of the invention, which is defined by the following claims.

We claim:

1. A method of locating a gas leak in a pipeline comprising the steps of:

providing a portable laser indicator having a laser generator for generating a parallel beam, a first lens positioned in front of the laser generator having a rounded curvature, so that as the beam of light projects through the lens, the parallel beam of light is uniformly diverged, a battery power source, a power switch, and a housing maintaining the laser generator and the first lens in alignment, and carrying the battery and power switch, said laser indicator generating a diverging beam to illuminate objects and airborne particulates; and;

walking adjacent to the pipeline using the laser indicator to illuminate escaping gas immediately in front of oneself and adjacent to the pipeline.

2. A method as in claim 1 wherein the first lens of the laser indicator has a rounded curvature to uniformly diverge the parallel beam of light comprises a concave lens.

3. A method as in claim 2 wherein the indicator further comprises a second lens, positioned in front of the laser generator and is adjustably spaced from the first lens, so that the divergence of the parallel beam may be varied to accommodate varying distances and varying areas, desired to be illuminated for viewing.

* * * * *